H. A. BRANDENBURGER.
TIRE.
APPLICATION FILED JULY 24, 1911.
1,034,966.
Patented Aug. 6, 1912.
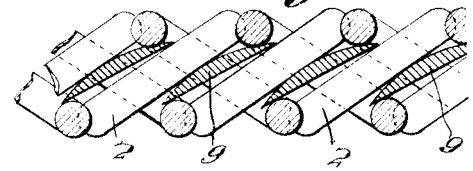
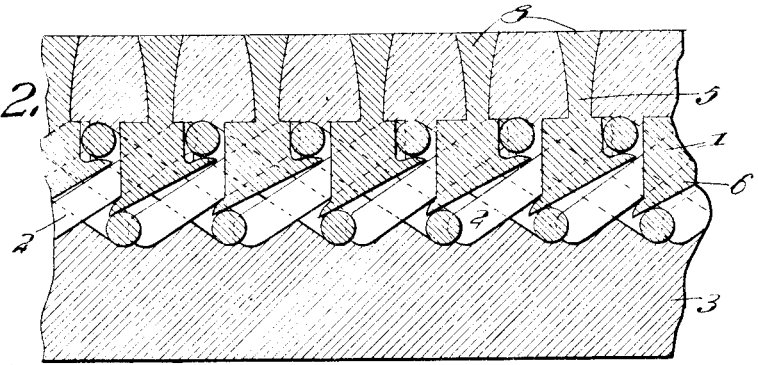
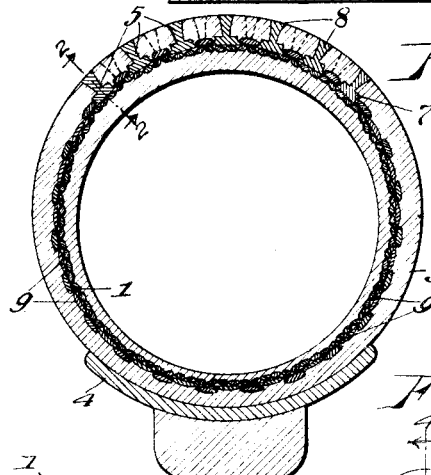
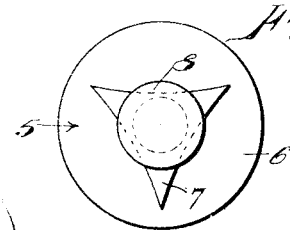
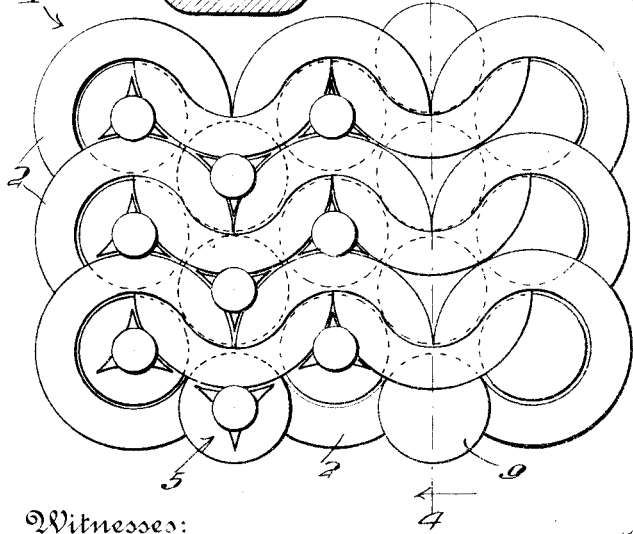
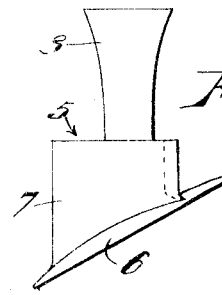
Witnesses:
George G. Anderson,
Bertha von Behren.
Inventor:
Herman A. Brandenburger,
By Hugh K. Wagner
Attorney.

UNITED STATES PATENT OFFICE.

HERMAN A. BRANDENBURGER, OF ST. LOUIS, MISSOURI.

TIRE.

1,034,966.  Specification of Letters Patent.  Patented Aug. 6, 1912.

Application filed July 24, 1911. Serial No. 640,296.

*To all whom it may concern:*

Be it known that I, HERMAN A. BRANDENBURGER, a citizen of the United States, residing at the city of St. Louis, State of Missouri, have invented certain new and useful Improvements in Tires, of which the following is a specification.

The present invention has reference to protective armor for automobile tires, and it comprehends certain improvements in tire armor of the type shown and described in my prior application, Serial No. 629,835, filed May 27, 1911. These improvements relate primarily to the filling disks which are inserted in the interstices of the metal fabric constituting the body of the armor, and they consist in constructing the aforesaid disks in such a manner as to increase the flexibility of the armor and to enable it to more readily shape itself to the contour of the tire.

A structural embodiment of the invention is illustrated in the accompanying drawings, wherein:

Figure 1 is a transverse sectional view of an automobile wheel equipped with a tire constructed in accordance with said invention; Fig. 2 is an enlarged section taken on the line 2—2 of Fig. 1; Fig. 3 is a plan view of a portion of the fabric; Fig. 4 is a section taken on the line 4—4 of Fig. 3; Figs. 5 and 6 are, respectively, a plan view and a side elevation of one of the filling pieces that are employed in the tread portion of the armor.

As shown in said drawings, the fabric proper 1 is composed of series of rows of rings 2 connected or interwoven together in much the same manner as the rings of a so-called coat of chain mail. The fabric is in the form of a continuous band which, in the construction illustrated, is embedded in the body of the tire proper 3 during the making thereof, and may be connected to the felly 4 of the wheel in any suitable manner, such, for instance, as that shown and described in my prior application above identified.

The interstices between mutually-adjacent rings are designed to receive filling pieces, which latter are preferably of two kinds as depicted in Fig. 3. The filling pieces 5 that are arranged in the tread portion of the tire are shown in detail in Figs. 5 and 6. They consist of disks 6 having convex outer faces and flat or plane inner faces, and are adapted to be embedded in the meshes of the fabric, their outer faces being formed with substantially triangular lugs 7 whose sides are curved to fit snugly against the portions of the rings directly adjacent thereto, so as to fill the triangular interstices, and, also, to hold said rings against movement in the rubber tire body. The outer ends of the lugs 7 are formed, in turn, with longitudinal projections 8, which are substantially triangular in shape and are designed to extend to the tread of the tire, thus affording additional wearing surface therefor.

The filling pieces 9 that are arranged along the side or longitudinal edge portions of the fabric are likewise constituted by plano-convex disks which are similar to the disk portions 6 of the tread filling pieces. These disks are held in place solely by the rings themselves, the latter being so closely interwoven as to require no extraneous retaining means.

The completed fabric, as will be understood from the foregoing, is of tubular conformation when completed, the inner edges of the fabric being left detached, however, until both sides of said fabric are covered with rubber, after which said edges are connected to each other and the joint then vulcanized. The tire thus formed will be strengthened to a great extent by the embedded fabric and especially at its tread portion, by reason of the extension of the projections 8 of the filling pieces 5 to the surface of that portion. The employment of the filling pieces results in the formation of a practically continuous metal fabric, as will be understood; and by utilizing the plano-convex disks above described the flexibility of the fabric is materially increased, since the fabric is allowed more easily to shape itself to the contour of the tire.

Inasmuch as the rubber runs into and fills the interstices in the chain-and-disk armor of this construction, as it does in the chain-and-disk armor of my copending application, Serial No. 625,836, filed May 27, 1911, the rubber so amalgamates with the chain-and-disk armor as to form as much an integral fabric as is rubber-soaked canvas or other reticulated material. Due to the disks held between the rings of the chain work, the rubber is irremovable, and is most intimately associated with all parts of the metal work, due to the fact that it runs into all the interstices of same while it is in a molten condition. The chain-and-disk rubber fabric thus formed possesses the qualities of flexibility and impenetrability that render same particularly well adapted for automobile tires.

What is claimed is:

1. Protective armor for tires comprising a band of chain fabric and filling disks inserted wholly in the interstices thereof, said disks having their outer sides convex and their inner sides flat.

2. Protective armor for tires comprising a continuous tubular band of chain fabric having its side edges connected together, and plano-convex filling disks inserted wholly in the interstices of said band.

3. A fabric comprising a body of rubber, and a band embedded therein and consisting of interwoven rings having plano-convex filling disks inserted in the interstices therebetween.

In testimony whereof I hereunto affix my signature in the presence of two witnesses.

HERMAN A. BRANDENBURGER.

Witnesses
LOTTIE M. FOX,
BERTHA VON BEHRENS.